United States Patent
Sundaresan et al.

(10) Patent No.: US 7,602,726 B1
(45) Date of Patent: Oct. 13, 2009

(54) METHOD AND SYSTEM FOR OPTIMIZING LINK AGGREGATION USAGE DURING FAILURES

(75) Inventors: Krishna Sundaresan, Sunnyvale, CA (US); Mahesh Chellappa, San Jose, CA (US); Chandrasekar Krishnamurthy, Sunnyvale, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 903 days.

(21) Appl. No.: 10/639,151

(22) Filed: Aug. 11, 2003

(51) Int. Cl.
*H04L 12/28* (2006.01)

(52) U.S. Cl. .................. 370/237; 370/230; 370/225; 709/242

(58) Field of Classification Search ...... 370/229–238.1, 370/395.1–395.72, 216–228, 535–537; 455/445; 398/1–8; 709/238–244
See application file for complete search history.

(56) References Cited

U.S. PATENT DOCUMENTS

| | | | | |
|---|---|---|---|---|
| 5,933,422 | A * | 8/1999 | Kusano et al. | 370/331 |
| 5,970,067 | A * | 10/1999 | Sathe et al. | 370/394 |
| 6,128,280 | A * | 10/2000 | Jamoussi et al. | 370/230 |
| 6,628,649 | B1 * | 9/2003 | Raj et al. | 370/360 |
| 6,772,102 | B1 * | 8/2004 | Wan et al. | 703/2 |
| 6,952,396 | B1 * | 10/2005 | Cottreau et al. | 370/222 |
| 6,956,824 | B2 * | 10/2005 | Mark et al. | 370/242 |
| 7,016,975 | B2 * | 3/2006 | Dolganow et al. | 709/242 |
| 7,200,110 | B1 * | 4/2007 | Burns et al. | 370/225 |
| 2003/0058804 | A1 * | 3/2003 | Saleh et al. | 370/254 |
| 2004/0205239 | A1 * | 10/2004 | Doshi et al. | 709/241 |
| 2004/0228278 | A1 * | 11/2004 | Bruckman et al. | 370/231 |

* cited by examiner

*Primary Examiner*—Aung S Moe
*Assistant Examiner*—Habte Mered
(74) *Attorney, Agent, or Firm*—Stolowitz Ford Cowger LLP (57) ABSTRACT

A method and system for optimizing link aggregation usage during failures is disclosed. The method and system are deployed in a network having a data plane in which data traffic flows between nodes coupled by a link formed by an aggregation of a number of individual connections (e.g., an IMA comprising a plurality of T1 or E1 lines, MPLS transport LSPs, ATM VPCs, etc.) and a control plane for controlling data traffic. The method includes communicating a bandwidth change on the link corresponding to the failure to the control plane. Flapping of the link is deterred. A component of the traffic is released based on a configured policy.

28 Claims, 7 Drawing Sheets

Detect Failure of Some Individual Line(s) Within IMA Group (or e.g., Some Individual MPLS LSP(s), etc.)
401

Communicate New Bandwidth Corresponding to Remaining Line(s) within IMA Group (or e.g., MPLS LSP(s), etc.) to PNNI or Other Control Plane 402

Bandwidth Guaranteed > New Bandwidth?
403
— No
Yes

Does This Side Release?
404
— No
Yes

Release Based on Configured Method?
405
— No
Yes

Start Releasing Calls According to Configured Method
406

Advertise New Bandwidth Into PNNI
407

METHOD AND SYSTEM FOR OPTIMIZING LINK AGGREGATION USAGE DURING FAILURES

TECHNICAL FIELD

Embodiments of the present invention relate to the field of network connection management. Specifically, embodiments of the present invention relate to a method and system for optimizing link aggregation usage during failures.

BACKGROUND OF THE INVENTION

Asynchronous Transfer Mode (ATM) technology is used as a backbone technology for some modern carrier networks. ATM supports network transmission of information including data as well as real-time voice and video. Networks employing ATM are typically characterized by a topology wherein network switches establish a logical circuit from one end of the network to another.

This topology functions to effectively guarantee Quality of Service (QoS) for the information transmitted over the ATM network. Inherent flexibility and efficiency typify ATM networks because unused bandwidth within the logical circuits therein can be appropriated when needed. For instance, idle bandwidth in an ATM circuit supporting a videoconference can be used to transfer bursts of data.

QoS specificity allows smooth ATM transmission of real-time critical information such as voice and video by providing a constant bit rate (CBR) to guarantee them sufficient bandwidth. Unspecified bit rate (UBR) provides a best effort for transmission of non-critical data. Applications that require minimal delay (e.g., interactive media), and bursty transaction traffic are respectively supported by real-time and non-real-time variable bit rate (rt-VBR and nrt-VBR).

ATM standards define inverse multiplexing over ATM (IMA) to aggregate multiple links (e.g., T1, E1) into a single virtual link. The virtual link provided by IMA is available for use by higher layer protocols such as the user-to-network interface (UNI), Interim Inter-Switch Signaling Protocol (IISP), ATM Inter-Network Interface (AINI) and private network-to-network interface (PNNI). Virtual links such as label switched paths (LSP) can also be provided by multi-protocol label switching (MPLS). ATM Virtual Path Connections (VPCs) can also comprise a virtual link.

Figure 1:
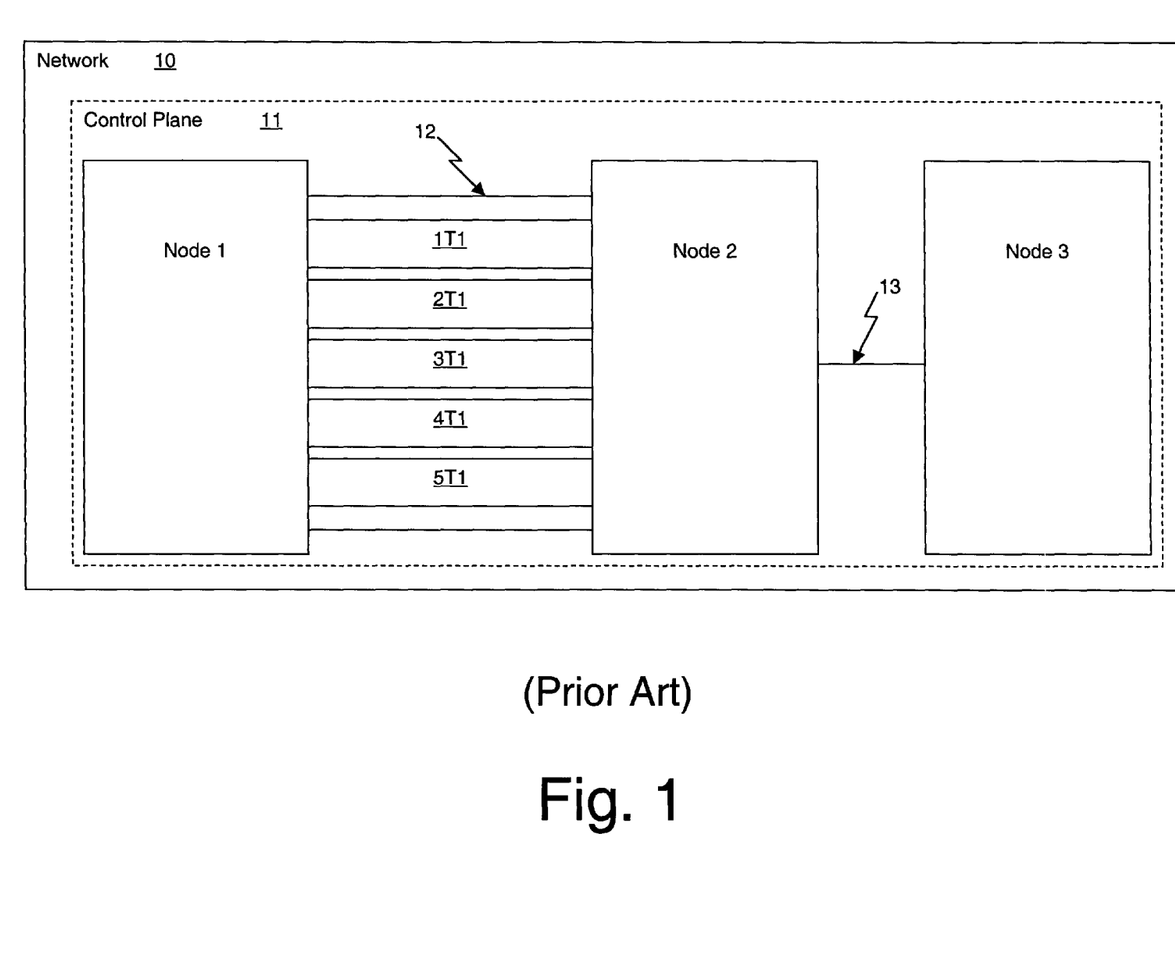
FIG. 1 depicts an exemplary conventional ATM network with an IMA linked PNNI trunk configured from multiple T1/E1 lines.

Prior Art FIG. 1 depicts an exemplary conventional ATM network 10. Within network 10, a virtual link 12 between nodes 1 and 2 comprises the aggregation (e.g., IMA) of five T1 links 1T1-5T1. By ATM standards, virtual link 12 comprises the aggregation of the T1 links. Thus from the perspective of the control plane 11, virtual link 12 is treated as a single, individual link, rather than as five independent links 1T1-5T1. Nodes 2 and 3 are linked by link 13.

For an IMA, group usage can be defined as two components. The maximum bandwidth of an IMA is the sum of the bandwidths of the individual link components comprising it. For example, the maximum bandwidth of IMA 12 is the sum of the individual bandwidths of 1T1-5T1. The Minimum link bandwidth is the minimum bandwidth guaranteed for the virtual link corresponding to the IMA. Minimum bandwidth is guaranteed aside from that of individual link components and is the bandwidth needed for the virtual link (e.g., IMA) to be operational, specified in number of links. It is appreciated that these definitions apply in the IMA plane Minimum link bandwidth is guaranteed notwithstanding any failure of the individual links comprising the virtual link. For instance, the minimum bandwidth of IMA 12 is guaranteed even if some of links 1T1-5T1 fail. From a perspective of the network control plane, group badwidth of a virtual link is binary; the link is either up (e.g., available) or down (e.g., unavailable). However, this conventional definition provides no informative granularity as to actual available bandwidth.

Without such granularity, upper layer protocols such as PNNI and MPLS are unaware of the actual available bandwidth of their constituent virtual links. The minimum link bandwidth of exemplary virtual link 12 is achievable as long as a minimum of two of the individual links 1T1-5T1 are available. Thus if links 3T1-5T1 fail, IMA 12 is still up, from a conventional perspective, as long as links 1T1 and 1T2 remain available.

However, the actual maximum bandwidth now available at IMA 12 has effectively degraded 60% to the sum of the bandwidths of only two individual T1 circuits, 1T1 and 2T1. Conventionally, PNNI still treats virtual link 12 as having 250% more bandwidth than is actually now available. The virtual link may thus be unable to effectively handle traffic that exceeds 40% of its defined maximum bandwidth. This can result in congestion, dropped data and QoS degradation.

For instance, where IMAs are deployed in locales wherein the connection costs of T1 or E1 (T1/E1) are high, they are typically loaded with connections that consume close to the maximum bandwidth. PNNI IMA links are becoming more commonly deployed, such as to route voice calls over IMA links. Congestion, dropped data and QoS degradation are inconsonant to voice calls and other such CBR services; they tend to degrade call quality, even significantly.

Where an IMA group (or e.g., a MPLS LSP, link bundle, VPCs, etc.) functions as a PNNI trunk, link PNNI topology state elements (PTSE) advertise the maximum bandwidth of the IMA group. Connections are routed through the link according to this maximum advertised bandwidth. A PNNI may sometimes route connections onto the IMA group so as to consume close to 100% of the maximum bandwidth of the link.

Where a failure occurs in one or more of the T1/E1s (or e.g., LSPs, individual links, VPCs, etc.) in the IMA group (MPLS, link bundle, etc.), the group bandwidth drops. The link stays up if its actual available group bandwidth remains at or above its minimum guaranteed bandwidth. The IMA group is up as long as the group satisfies the condition of the minimum number of retained T1/E1 links. Where connections consume close to 100% of the maximum bandwidth, the data plane can become congested.

There may be within the network underutilized paths available, but as the established connections are through the IMA group (or e.g., LSP bundle, link bundle, VPC bundle, etc.), the congestion goes unabated. Congestion and data loss in the data plane are not reflected in the PNNI control plane because the degradation in actual available bandwidth is not communicated to the control plane. The PNNI thus takes no responsive action, such as release of the connections (e.g., of the bandwidth-degraded virtual link).

Under these conditions, the node conventionally continues trying to send all configured traffic over the bandwidth-degraded IMA group. In the face of insufficient available bandwidth congestion, data is randomly discarded. Data connections (UBR) so oversubscribed may adjust to the available bandwidth, such as by Transfer Control Protocol (TCP) windowing and other techniques. Voice calls (and/or other CBR e.g., video) however undergo statistically even degradation.

Under conditions of severe congestion on the data plane resulting from marked degradation in actual available bandwidth over a constituent virtual link, problematic results may become apparent. For example, those skilled in the art are aware of the so-called "last straw" problem, wherein a new voice call over a congested network degrades the quality of all of the calls then in progress over that network. This can be very problematic for voice and data calls and the like.

Calls and other network traffic can be re-routed by the control plane as quality problems become apparent. However, calls have already sustained degraded quality by this point. Such reactive re-routing can also impact available bandwidth in the newly configured links. Further, fluctuations in the available bandwidth through any of the network's links can diminish network stability by causing flapping to occur, in which the availability of a route toggles.

Conventionally, configuring the PNNI bandwidth to be the minimum number of IMA links implicitly grossly undersubscribes the link. Configuring the PNNI bandwidth to be the maximum number of IMA links however unwittingly oversubscribes the link in the event of the failure of an individual component line of that link, since the PNNI control plane is unaware of the degradation in actual available bandwidth and thus fails to release calls in an organized fashion.

The issues described above are not unique to IMA groups, but are rather characteristic of PNNI trunks tunneled using other technologies as well. For instance, the issues apply to PNNI trunks tunneled using multiple MPLS LSPs. To provide availability, multiple MPLS transport LSPs are used as a single PNNI trunk. Failure of individual component LSPs thus degrade the actual available bandwidth of the MPLS configured PNNI trunk, as discussed above (e.g., IMA configurations). These issues also apply to other aggregated links, such as ATM VPCs, etc.

The issues also arise with other control planes that signal connections which traverse virtual interfaces configured as bundles. These virtual interfaces include Multilink Point-to-Point Protocol (MLPPP), Multilink Frame Relay (MFR), and other bundles in which the control plane routing and signaling is not aware of the bundling.

Conventional approaches can thus be problematic. Failure of individual component links comprising PNNI trunks tunneled using IMA groups, multiple MPLS LSPs, ATM VPCs, and/or other technologies reduce the actual available bandwidth of the PNNI trunk, yet without control plane awareness thereof. Control plane action responsive to the degradation in actual available bandwidth on the data plane is thus not triggered. Congestion, data loss, flapping, and/or QoS degradation can result.

SUMMARY OF THE INVENTION

A method and system for optimizing link aggregation usage during failures is disclosed. The method and system are deployed in a network having a data plane in which data traffic flows between nodes coupled by a link comprising an aggregation of a number of individual connections (e.g., an IMA comprising a plurality of T1 or E1 lines, MPLS transport LSPs, ATM VPCs, etc.) and a control plane for controlling data traffic. The method comprises communicating a bandwidth change on the link corresponding to the failure to the control plane. A component of the traffic is released based on a configured policy. Flapping of the link is deterred in one embodiment.

In one embodiment, communicating the bandwidth change comprises, upon detecting the failure, ascertaining the available bandwidth on the link remaining after the failure. A determination is made that a curremtly used bandwidth corresponding to the link exceeds the available bandwidth. The available bandwidth is advertised to the control plane. Releasing the component can be based on a low priority of the component relative to a non-released component. The release can also be based on a lower quality of service (QoS) corresponding to the component relative to a non-released component of the traffic.

In one embodiment, QoS comprises a bit rate selected for release in the following order: unspecified bit rate (UBR) have the lowest QoS and are thus released before any of the others. Available bit rate (ABR) has a higher QoS than UBR and is thus selected for release next, if necessary. Similarly, non-real-time variable bit rate (nrt-VBR) has higher QoS than ABR, real-time variable bit rate (rt-VBR) has higher QoS than nrt-VBR. The release order proceeds as necessary from lower to higher QoS. In one embodiment, high QoS constant bit rate (CBR) are not released. In one embodiment, connections utilized by the network control plane, sometimes called control Virtual Channels (control VCs), are not released. Such control VCs can include, but are not limited to, a Routing Control Channel (RCC) connection, an Interim Local Management Interface (ILMI), a Service-Specific Connection-Oriented Protocol (SSCOP) connection, or a Network Clock Distribution Protocol (NCDP) connection.

BRIEF DESCRIPTION OF THE DRAWINGS

Conventional Art

DETAILED DESCRIPTION OF THE INVENTION

A method and system for optimizing link aggregation usage during failures is disclosed. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known components, circuits, methods, materials, and procedures have not been described in detail so as not to unnecessarily obscure aspects of the present invention. Embodiments of the present invention are discussed primarily in the context of a method and system for optimizing link aggregation usage during failures.

Figure 3:
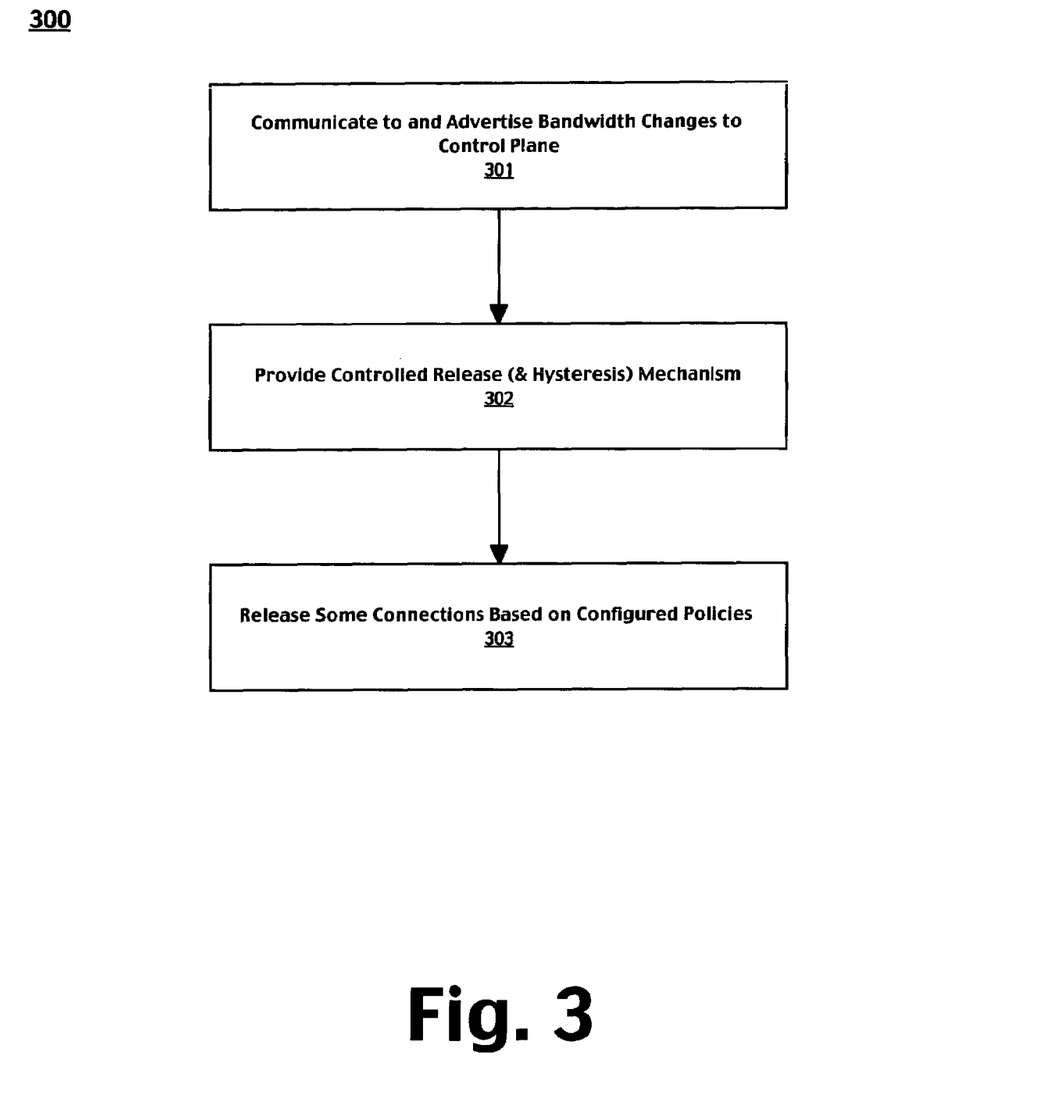
FIG. 3 is a flowchart of a process for releasing connections based on configured policies in response to degraded link bandwidth, according to one embodiment of the present invention.
Figure 4:
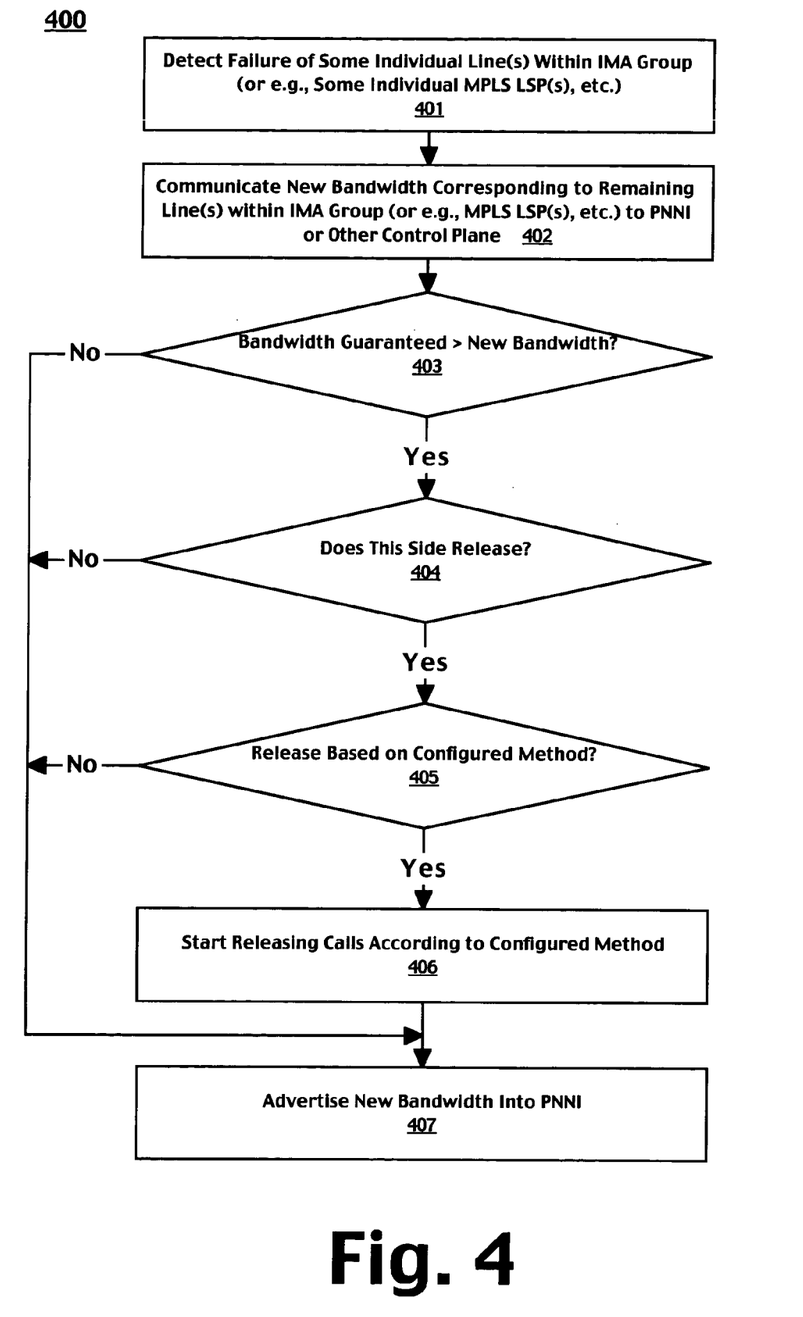
FIG. 4 is a flowchart of a process for advertising new bandwidth for a virtual link in a network, according to one embodiment of the present invention.
Figure 5:
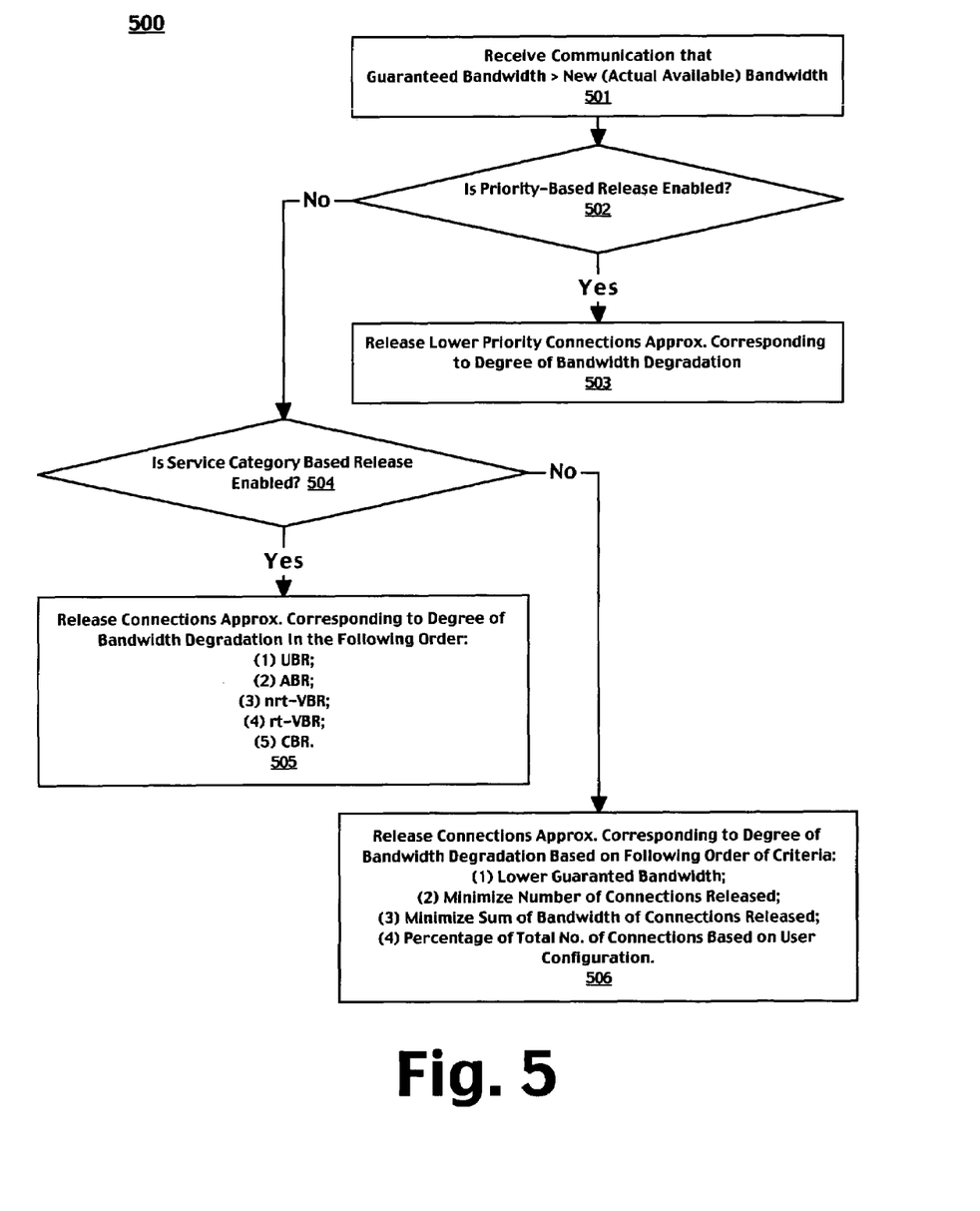
FIG. 5 is a flowchart of a process for releasing calls over a virtual link in a network, according to one embodiment of the present invention.

Certain portions of the detailed descriptions of embodiments of the invention, which follow, are presented in terms of processes and methods (e.g., processes 300, 400, and 500 of FIGS. 3, 4, and 5, respectively). Although specific steps are disclosed herein describing the operations of these processes and methods, such steps are exemplary. That is, embodiments of the present invention are well suited to performing various other steps or variations of the steps recited in the flowcharts of the figures herein.

In one embodiment, such processes are carried out by processors and electrical/electronic components under the control of computer readable and computer executable instructions comprising code contained in a computer usable medium. The computer readable and computer executable instructions reside, for example, in code within a computer usable medium and used in the processor, data storage features, memory, registers and other components of a computer system performing the method for maintaining sufficient bandwidth on a network link during failures. However, the computer readable and computer executable instructions may reside in any type of computer readable medium.

A computer system that embodies a system and performs a method for optimizing link aggregation usage during failures can comprise any kind of computer system with sufficient computing power and memory capacity. For example, the computer system can comprise a specialized network control computer system, a server computer system, a specialized telecommunications control computer system, a workstation computer system, a personal computer system, a specialized business and financial computing system, a main-frame computer system, or a supercomputer system. Modules of the system for maintaining sufficient bandwidth on a network link during failures can be implemented in software, firmware, and/or hardware or any combination of software, firmware, and/or hardware.

A method and system for optimizing link aggregation usage during failures is disclosed. The method and system are deployed in a network having a data plane in which data traffic flows between nodes coupled by an aggregated link (e.g., an IMA comprising a plurality of T1 or E1 lines, MPLS transport LSPs, ATM VPCs, etc.) and a control plane for controlling data traffic. The method comprises communicating a bandwidth change on the link corresponding to the failure to the control plane. Flapping of the link is deterred. A component of the traffic is released based on a configured policy.

Therefore, the conventional lack of control plane awareness of link bandwidth changes corresponding to individual component connection failures can be remedied by advertising actual available bandwidth remaining after a failure to the control plane. Action such as release of connections and re-routing can be taken. This increases network reliability and deters link flapping, thus advantageously promoting network stability. Problems that can occur in conventional network control approaches following failures such as data plane congestion and quality of service (QoS) degradation can thus be ameliorated.

Exemplary Platform

Figure 2:
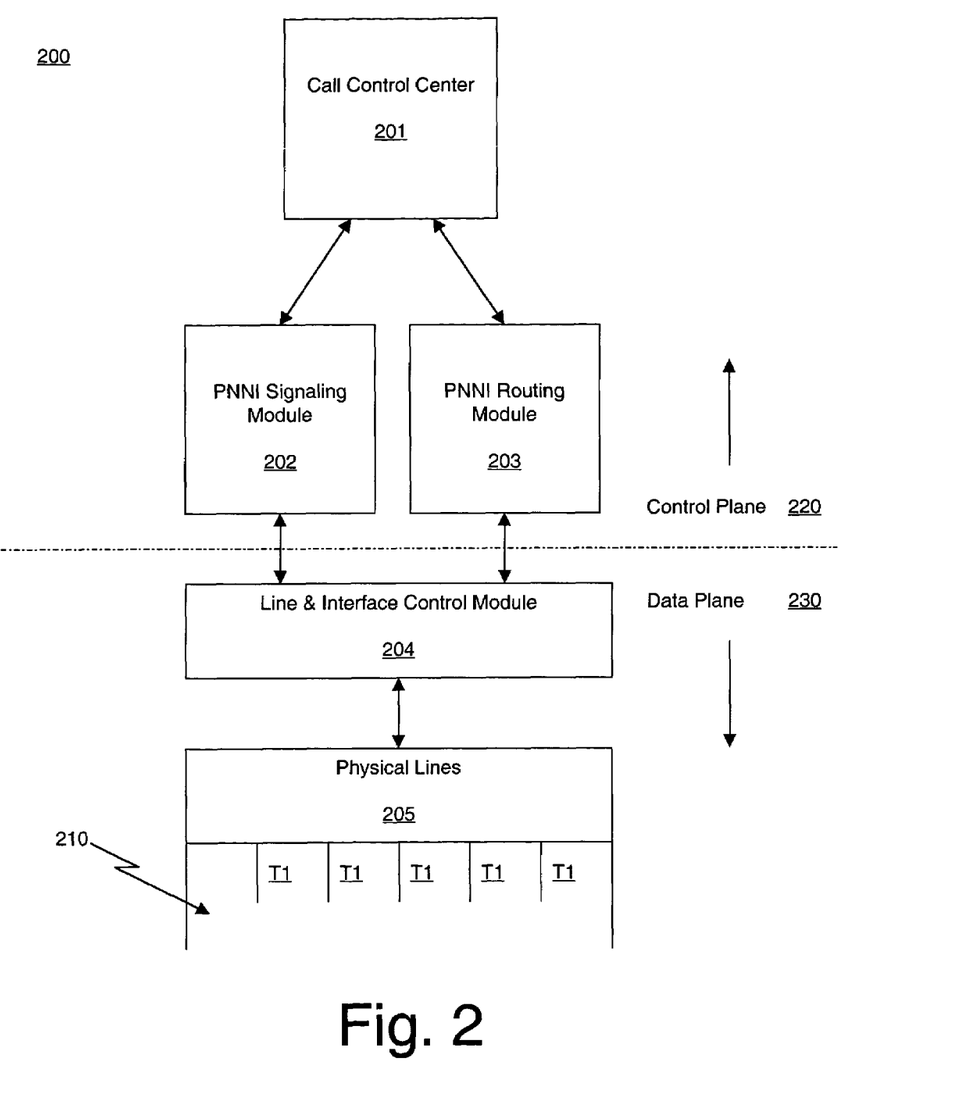
FIG. 2 depicts an exemplary PNNI control plane and data plane platform, upon which one embodiment of the present invention can be deployed.

FIG. 2 depicts an exemplary PNNI control plane and data plane platform 200, upon which one embodiment of the present invention can be deployed. A call control center 201 interacts with private network-to-network interface (PNNI) signaling module 202 and PNNI routing module 203 to monitor and control physical lines 205 through a line driver module 204. Physical lines 205 comprise a plurality of individual links that are configurable as a single virtual link 210.

Virtual link 210 is configured in one embodiment as an aggregated link, such as from individual physical lines 205 by inverse multiplexing for ATM (IMA). Lines 205 can be T1 or E1 (T1/E1) lines. Lines 205 can also represent individual label switched paths (LSP) in an embodiment wherein virtual link 210 is configured therefrom by multi-protocol label switching (MPLS). In another embodiment, lines 205 represent Asynchronous Transfer Mode Virtual Path Connections (ATM VPCs) and their aggregation comprises virtual link 210. Yet another embodiment of the present invention configures virtual link 210 from by aggregation using other technologies. In still another embodiment, virtual link 210 could in fact comprise multiple virtual links each of which uses a subset of the resources (such as Virtual Path Identifier range) of the aggregate. The control plane then would be aware of several virtual links, perceived as riding over an aggregation of links or connections.

Control plane 220 comprises call control center 201, PNNI signaling module 202, and PNNI routing module 203. Data plane 230 comprises the line and interface control module 204 and virtual link 210 and its constituent physical lines 205. In one embodiment, line and interface control module 204 comprises an interface between control plane 220 and data plane 230. In one embodiment, call control center 201 can interface with one PNNI signaling module, one PNNI routing module, and multiple line and interface control module to control multiple virtual links.

Exemplary platform 200 can comprise an element of a network such as network 700 (FIG. 7) below. Within such a network, platform 200 operates in one embodiment to release connections based on an interface policy configuration. In one embodiment, the connections are released for re-routing when the maximum link bandwidth of virtual link 210 (e.g., of the IMA, LSPS, etc.) decreases due to a failure of some of individual lines 205 (e.g., individual T1/E1s, LSPs, etc.).

In one embodiment, platform 200 operates to release the connections when link 210 is called upon to guarantee more than the currently available actual bandwidth of the IMA group (or e.g., MPLS transport LSP, etc.) comprising link 210. Thus, platform 200 can function to optimize link aggregation during failures of individual lines comprising the link. In one embodiment, the policy upon which the selective release of connections is based is selectable from several configurations.

In one embodiment, the configurable policies selectable for releasing connections include the policies listed in Table 1, below.

TABLE 1

Configurable Connection Release Policies

1. Priority of the Connection Communicated (e.g., communicated in the General Application Transport (GAT) Information Element (IE) in a setup message)
2. Connection Guaranteed Bandwidth
3. Service Category (e.g., release UBR first; release CBR last, etc.), Coupled with the Guaranteed Bandwidth of the Connections
4. Percentage of the Total Number of Connections Based on User Configuration;
5. Minimize Number of Connections Released
6. Minimize Sum of Bandwidth of Connections Released Another cognizable release policy can be selected to release connections in one embodiment.

Characteristics of the connection (e.g., link 210) to the network are communicated to call control center 201, such as by PNNI routing module 203. When call control center 201 receives advertisement of a bandwidth change, such as by PNNI signaling module 202, it re-routes the connection according to the policy. The characteristics can be those summarized in Table 1 above, or another cognizable attribute.

With connection priority selected as the configuration policy, connections deemed to have lower priority can be released for re-routing upon communicating bandwidth degradation therein, before connections deemed to have higher priority. This action functions to bolster the available bandwidth for the higher priority connections, effectively by load shedding. At the same time, the action serves to maintain the established connection of the higher priority connections.

With connection guaranteed bandwidth as the selected criterion for release, connections having guaranteed bandwidth can be released for re-routing upon bandwidth degradation below or near the limits of their guarantee, or their connection can be retained and their actual available bandwidth bolstered by releasing connections that lack guaranteed bandwidth. Connection guaranteed bandwidth can also be coupled in one embodiment with the service category (e.g., QoS). In one embodiment, connections with smaller guaranteed bandwidths can be released earlier, and connections with larger guaranteed bandwidths can be released later.

Selecting service category combined with connection guaranteed bandwidth to configure the release policy can allow QoS guarantees and structures to be taken into account by call control center 201. For instance, connections for real-time critical information such as voice and video guaranteed a constant bit rate (CBR) can be retained longest and their actual available bandwidth bolstered by releasing connections carrying non-critical data at an unspecified bit rate (UBR) before them.

A percentage of the total number of connections based on user-configuration can be selected for release. The selection of connections for release can also be based on a policy of minimizing the number of connections released, which may imply selecting large bandwidth connections for release before lower bandwidth connections. Alternatively, the sum of the bandwidth of the connections released can provide the basis for the selection.

In one embodiment, another connection attribute can comprise the criterion upon which to base a policy selecting the release of connections for re-routing. In one embodiment, policies listed in Table 1 and discussed above can be combined to form hybrid policies. Advantageously, the variety of available policies provide flexibility to call control center 201 and allow the networks deploying an embodiment of the present invention with greater reliability.

Figure 6:
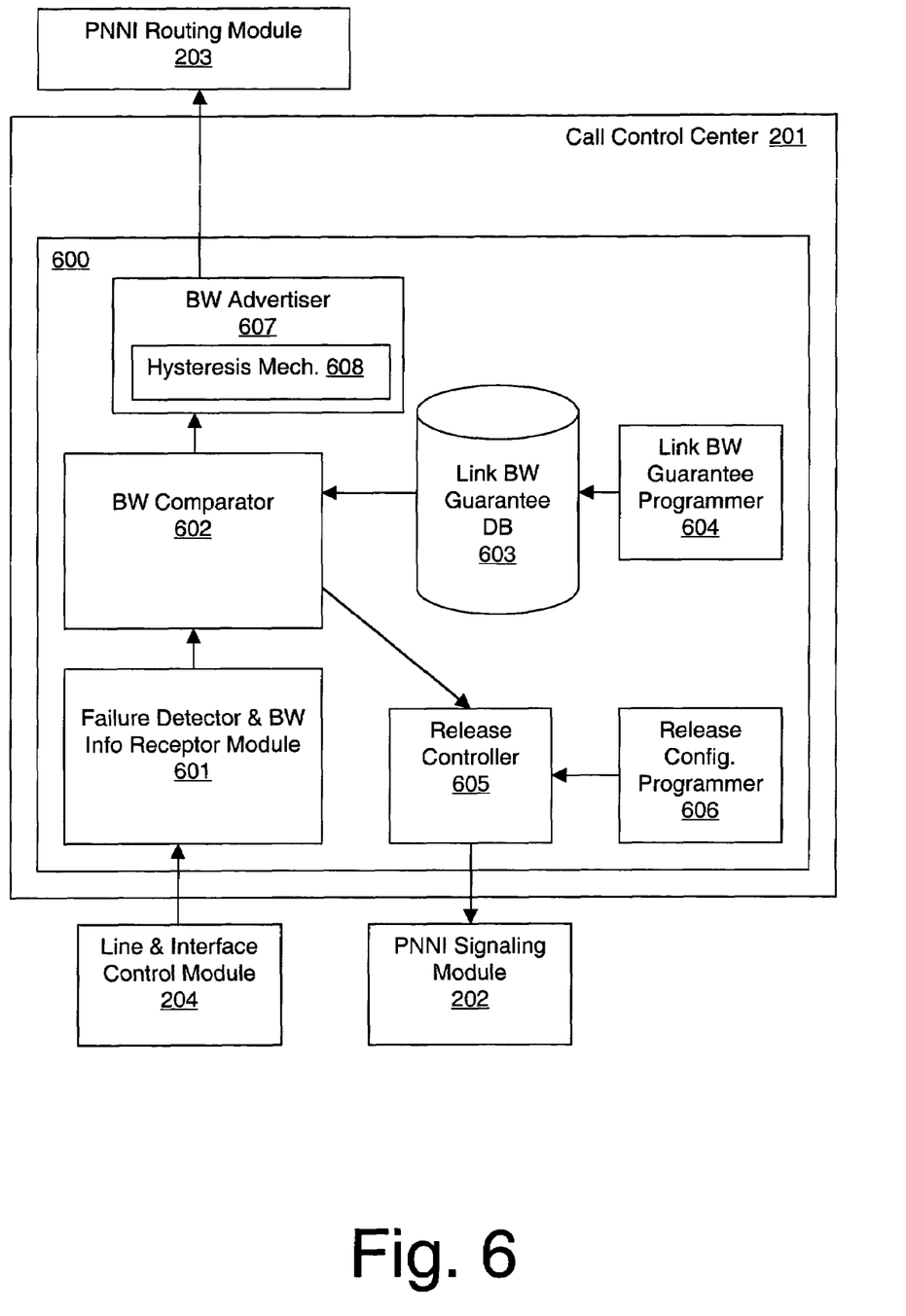
FIG. 6 depicts a system for releasing connections based on configured policies in response to degraded virtual link bandwidth, according to one embodiment of the present invention.

Whichever policy is selected upon which to base the release of the connections in the face of advertised bandwidth changes allows call control center 201 to provide a hysteresis mechanism to the network. Connections are selected for release based on a consistent policies in response to developing bandwidth changes (e.g., rather than randomly and after the fact of unavailability of bandwidth develops). Advantageously, this promotes network stability. A hysteresis mechanism (e.g., anti-hysteresis module 608; FIG. 6) is provided such that, when an individual T1 (or e.g., other individual connection comprising a link component) is recovering after failure, the bandwidth in this T1 is only advertised to the control plane after a specified time has elapsed. This helps to prevent network instability in the event of a single T1 link going up and down repetitively.

Exemplary Processes

Platform 200 can thus optimize link aggregation during failures characterized by degraded bandwidth within the link. In one embodiment, this can be effectuated by releasing connections based on configured policies in response to degraded link bandwidth. FIG. 3 is a flowchart of a process 300 for releasing connections based on configured policies in response to degraded link bandwidth, according to one embodiment of the present invention.

Process 300 begins with step 301, wherein bandwidth changes are communicated to and advertised by the control plane. For instance, a link and interface control module (e.g., link and interface control module 204; FIG. 2) can inform a call control center that bandwidth has degraded in the link it is monitoring. Bandwidth loss can result the failure of some of the T1 lines aggregated into a PNNI link (or e.g., some of the MPLS transport LSPs comprising a trunk). Thus, the control plane becomes aware of the degraded actual available bandwidth.

In step 302, a controlled release mechanism is provided. For instance, policies can be pre-configured for the graceful release of connections in the face of developing bandwidth limitations. The policies can pre-select which connections are to be released and under what circumstances. This can allow the pre-planning of new routing for the connections to be released under the policy. Further, a hysteresis mechanism is provided to prevent undesired network instability in the presence of individual link flaps. For instance, when an individual T1 (or e.g., other individual connection comprising a link component) is recovering after failure, the bandwidth in this T1 is only advertised to the control plane after a specified time has elapsed. This helps to prevent network instability in the event of a single T1 link going up and down repetitively. Thus, the controlled release mechanism generates the configured policy and reduces hysteresis.

In step 303, some connections are released based on the configured policies. With bandwidth limitations developing, connections can be released gracefully (rather than reactively and stochastically or randomly), according to the preconfigured connection release policy. The policies can be based upon, for example, characteristics of the connection, including bandwidth and QoS guarantees, amongst other factors. Upon completion of step 303, process 300 is complete.

FIG. 4 is a flowchart of a process 400 for advertising new bandwidth for a virtual link in a network, according to one embodiment of the present invention. In one embodiment, process 400 can implement the step 301 of Process 300 (FIG. 3) discussed above. Process 400 begins with step 401, wherein a failure is detected of one or more individual lines within an IMA group (or e.g., individual MPLS transport LSP, etc.) comprising a network connection.

In step 402, the new bandwidth corresponding to the remaining lines within the IMA group (or e.g., individual MPLS transport LSP, etc.) is communicated to a PNNI control plane entity, such as to a call control center through a line and interface control module. In step 403, it is determined (e.g., by the PNNI control plane entity) whether the bandwidth guaranteed for the network connections is greater than the new bandwidth corresponding to the remaining active lines.

If it is determined that the bandwidth guaranteed for the network connection is not greater than the new bandwidth corresponding to the remaining active lines, then in step 407, the new bandwidth is advertised by PNNI (e.g., the control plane). If it is determined that the bandwidth guaranteed for the network connection is greater than the new bandwidth, then in step 404, the side responsible for releasing the connections is determined.

One side of the link is responsible for releasing the connections based on a configured side or based on a pre-agreed (e.g., pre-selected and/or designated) release designation. Such release designations can include, but are not limited to, a higher node identifier for PNNI, the side configured as the 'network' side for IISP and UNI, the side designated as responsible (e.g., enabled for assigning, for example, a virtual private interface for a switched virtual circuit, such as enabled by a 'vpivcialloc' option for AINI), the side with the higher Internet Protocol (IP) address for an IP application, or the side with the higher Label Distribution Protocol (LDP) identifier for an LDP application, for example.

If it is determined that the side does not release, then in step 407, the new bandwidth is advertised by PNNI. If it is determined that the side does release, then in step 405, it is determined whether connections are to be released by a configured side, a higher node identifier, or any other pre-arranged method. If it is determined that the connections are to be released by a configured side, a higher node identifier, or any other pre-arranged method, then in step 407, the new bandwidth is advertised by PNNI. If it is determined that the connections are to be released by a configured side, a higher node identifier, or any other pre-arranged method, then in step 406, calls are started to be released according to the pre-arranged method. Upon releasing the calls according to the pre-arranged method, in step 407, the new bandwidth is advertised into the PNNI. Process 400 is complete upon completion of step 407.

FIG. 5 is a flowchart of a process 500 for releasing calls over a virtual link in a network, according to one embodiment of the present invention. In one embodiment, process 500 can implement the step 405 of Process 400 (FIG. 4) discussed above. Process 500 begins with step 501, wherein a communication is received that bandwidth guaranteed for a network connection is greater than the new actual available bandwidth (e.g., remaining after failure of an individual component).

In step 502, it is determined whether priority based release is enabled. If priority based release is enabled, then in step 503, lower priority connections are released. In one embodiment, the sum of the bandwidth of the lower priority connections released approximates (e.g., approximately corresponds to) the degree of bandwidth degradation communicated (e.g., to the degree to which the guaranteed bandwidth exceeds the new bandwidth).

If it is determined that priority based release is not enabled, then in step 504 it is determined whether service (e.g., QoS) category based release is enabled. If service category based release is enabled, then in step 505, connections are released in the following order of service categories:

(1) UBR;
(2) available bit rate (ABR);
(3) nrt-VBR;
(4) rt-VBR; and
(5) constant bit rate (CBR).

In one embodiment, the sum of the bandwidth of the connections released approximates the degree of bandwidth communicated degradation.

In one embodiment, if service category based release is not enabled, then in optional step 506 connections are released in the following order of criteria:

(1) lower guaranteed bandwidth;
(2) minimize number of connections released (e.g., to approximate the degree of bandwidth degradation communicated);
(3) minimized the sum of the bandwidth of the connections released; and (4) percentage of total number of connections based on user configuration.

In another embodiment, release can be performed on the basis of a different order of the criteria. In yet another embodiment, if service category based release is not enabled, then process 500 can execute step 503, discussed above. In one embodiment, the sum of the bandwidth of the connections released approximates the degree of bandwidth communicated degradation. Process 500 can be complete upon completion of steps 503, 505, or 506.

Exemplary System

FIG. 6 depicts a system 600 for releasing connections based on configured policies in response to degraded virtual link bandwidth, according to one embodiment of the present invention. In one embodiment, system 600 can be deployed within call control center 201. System 600 comprises a failure detector and bandwidth information receptor (detector/receptor) module 601, which receives notification of the failure of individual lines and link bandwidth impact.

In one embodiment, detector/receptor 601 receives notification of the failure of individual lines (or e.g., MPLS transport LSPs, etc.) comprising a link and concomitant bandwidth degradation thereof from a line and interface control module 204. Detector/receptor 601 processes this information into actual bandwidth availability information. Detector/receptor 601 provides the actual bandwidth availability information to a bandwidth comparator 602.

Bandwidth comparator 602 receives the actual bandwidth availability information from detector/receptor 601 and compares the information to information corresponding to the guaranteed bandwidth of the link. Link guaranteed bandwidth information is extracted from a guaranteed bandwidth information repository, which in one embodiment comprises a link guaranteed bandwidth database 603. In one embodiment, link bandwidth guarantee programmer 604 writes this information to database 603.

Bandwidth comparator 602 notifies a bandwidth advertiser 607 of the actual available bandwidth of the link. Bandwidth advertiser 607 has a hysteresis mechanism 608. Hysteresis (e.g., anti-hysteresis) mechanism 608 is provided such that, when an individual T1 (or e.g., other individual connection comprising a link component) is recovering after failure, the bandwidth in this T1 is only advertised to the control plane after a specified time has elapsed. This helps to prevent network instability in the event of a single T1 link going up and down repetitively (e.g., link flapping).

Bandwidth advertiser 607 advertises the actual available bandwidth to PNNI routing module 603. Upon comparing the actual link bandwidth availability with the link guaranteed bandwidth, bandwidth comparator 602 sends release permission to release controller 605. Release controller 605 receives a release policy and a release side configuration (or e.g., policy) from release configuration programmer 606.

Release configuration programmer 606 configures release policies (e.g., as in Table 1), and in one embodiment specifies a selected policy to release controller 605. In another embodiment, PNNI control 699 can function with release configuration programmer 605 to select and specify a release policy to release controller 605. Upon receiving a release permission and deciding that the local side is responsible for releasing connections, release controller releases such connections according to the specified policy, in one embodiment using PNNI signaling module 202.

Exemplary Network

Figure 7:
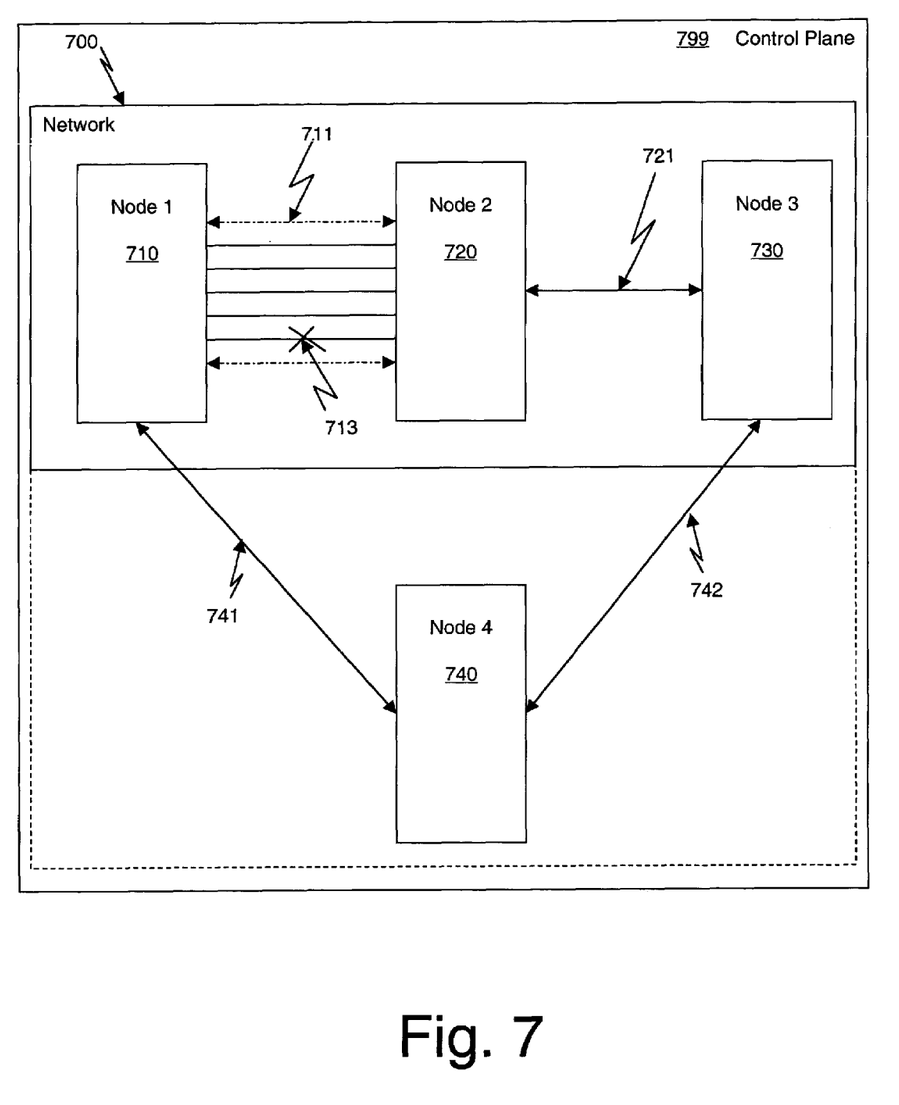
FIG. 7 depicts a network releasing calls across a degraded virtual link and re-routing the calls, according to one embodiment of the present invention.

FIG. 7 depicts a network 700 releasing calls across a degraded virtual link and re-routing the calls, according to one embodiment of the present invention. Network 700 comprises nodes 710, 720, and 730. Node 710 is linked to node 720 by a virtual link 711. Node 720 is linked to node 730 by a virtual link 721. A fourth node 740 is available to network 700 for linking node 710 through to node 730 via virtual links 741 and 742 with equivalent available bandwidth.

Virtual link 711 comprises a group of individual links such as an IMA aggregating five T1 (or e.g., E1) lines (or e.g., five MPLS transport LSPs, etc.). During the course of normal operations of network 700, traffic comprising a variety of QoS categories including CBR, VBR, UBR, etc. is routed between nodes 710 and 730 through node 720 via links 711 and 721. The level of this traffic requires the full bandwidth capacity provided by all five individual T1 lines.

Individual line 713 fails; bandwidth available to transport traffic between nodes 710 and 720 is thus degraded by 20%. Conventionally, data congestion is expectable and link 711 could fail completely. Further, upon restoration link 711, flapping occurs if link 711 toggles as the bandwidth rises above and below the demands of the traffic between nodes 710 and 730. Network 700 however employs a routing protocol according to an embodiment of the present invention.

For instance, the failure of line 713 and the concomitant bandwidth degradation of link 711 is detected and the new actual available bandwidth reported to the control plane 799 of network 700. Control plane 799 determines that the number of connections (e.g., the bandwidth) guaranteed for link 711 exceeds the new actual available bandwidth of the link. In the present embodiment, control plane 799 orders a release based on a configured policy.

According to the exemplary configured policy, UBR calls, which comprise for example 40% of the node 710-node 730 traffic through node 720, are released and re-routed though available node 740 via links 741 and 742. Advantageously, link 711 is maintained up despite the failure of line 713, and with bandwidth sufficient to sustain the uncongested flow of all CBR and VBR traffic between nodes 710 and 730 through node 720.

The new actual available bandwidth of virtual link 711 is advertised to PNNI control plane 799. Thus, the control plane becomes aware of the capacity of link 711 with line 713 down. Control plane 799 can thus operate so as not to divert traffic back onto link 711 that could, under the circumstances, cause congestion or link flapping. The present embodiment provides reliability and stability to network 700 and helps to prevent instability problems by providing a hysteresis mechanism.

In summary, a method and system for optimizing link aggregation usage during a failure are deployed in a network having a data plane in which data traffic flows between nodes intercoupled by a link comprising an aggregation of a number of individual connections and a control plane for controlling data traffic. The method comprises communicating a bandwidth change on the link corresponding to the failure to the control plane. A component of the traffic is released based on a configured policy.

An embodiment of the present invention, a method and system for optimizing link aggregation usage during a failure, is thus described. While the present invention has been described in particular embodiments, it should be appreciated that the present invention should not be construed as limited by such embodiments, but rather construed according to the following claims and their equivalents.

What is claimed is:

1. A method comprising:
receiving, at a call control center, a notification that identifies a failure of at least a portion of a data link and an impact the failure has on a bandwidth associated with the data link;
determining, in the call control center, an available bandwidth associated with the data link after the failure responsive to the impact the failure has on the bandwidth associated with the data link received in the notification;
transmitting, to a route controller, the available bandwidth for the data link from the call control center, the available bandwidth determined responsive to the received notification, the route controller to receive the available bandwidth from the call control center and to direct utilization of the data link by one or more connections according to the communicated available bandwidth from the call control center;
comparing, at the call control center, the available bandwidth associated with the data link after the failure to a bandwidth guaranteed to connections utilizing the data link;
releasing, by the call control center, one or more of the connections from the data link based on a configured policy when the bandwidth guaranteed to connections utilizing the data link is greater than the available bandwidth associated with the data link after the failure, wherein the call control center includes a controlled release mechanism to generate the configured policy and to direct an incremental release of connections from the data link based on developing bandwidth limitations;
detecting, at the call control center, the data link is recovering from the failure;
determining, at the call control center, a new available bandwidth associated with the recovery of the data link from the failure; and
delaying transmission of the new available bandwidth to the route controller, from the call control center, for a predetermined period of time, wherein the route controller is configured to divert one or more connections to the data link according to the new available bandwidth received from the call control center.

2. The method as recited in claim 1 wherein said releasing comprises releasing at least one connection based on a low priority of said connection relative to a non-released connection.

3. The method as recited in claim 1 wherein said releasing comprises releasing at least one connection that includes non-real-time critical information before releasing connection that includes real-time critical information.

4. The method as recited in claim 1 wherein said mechanism reduces hysteresis in said data link.

5. The method as recited in claim 1 wherein said data link comprises a virtual link selected from the group consisting essentially of Inverse Multiplexing for Asynchronous Transfer Mode (IMA), Label Switched Paths (LSP) for Multi-Protocol Label Switching (MPLS), and Asynchronous Transfer Mode Virtual Path Connections (ATM VPCs).

6. A system comprising:
a detector for detecting a failure of at least a portion of a link and ascertaining an available bandwidth on said link remaining upon said failure, where the detector is adapted to receive a notification that identifies the failure and an impact the failure has on a bandwidth associated with the data link;
a comparator coupled to said detector for comparing said available bandwidth to a guaranteed bandwidth for said link and, upon determining that said available bandwidth is less than said guaranteed bandwidth, generating a release permission;
a release controller coupled to said comparator for receiving said release permission and, upon said receiving, incrementally releasing one or more connections associated with the link based on developing bandwidth limitations, wherein the incremental releasing is performed, at least in part, to minimize a number of connections released or to minimize a total amount of bandwidth released; and an advertiser coupled to said comparator for advertising said available bandwidth to a route controller, the route controller capable of directing utilization of the link by one or more connections according to the advertised available bandwidth, where the detector to detect the data link is recovering from the failure and determine a new available bandwidth associated with the recovery of the data link from the failure, and the advertiser to delay communication of the new bandwidth to the route controller for a predetermined period of time, where the route controller is configured to divert one or more connections to the link according to the new available bandwidth received from the advertiser.

7. The system as recited in claim 6 further comprising a bandwidth guarantee programmer coupled to said repository for loading said information onto said repository.

8. The system as recited in claim 6 further comprising a release configuration programmer coupled to said release controller for configuring said policy.

9. The system as recited in claim 6 wherein said releasing comprises determining which said of said aggregated link will release said component.

10. The system as recited in claim 6 wherein said advertiser comprises a hysteresis mechanism for reducing instability in said network in the presence of flapping of said component of said link.

11. The system as recited in claim 6 further comprising a repository of information coupled to said comparator for providing said information to said comparator wherein said information includes said guaranteed bandwidth, wherein said repository comprises a database.

12. The system as recited in claim 6 wherein said detector is informed of said failure by a line interface control module.

13. The system as recited in claim 6 wherein said release controller performs said releasing by sending a release order to a signaling module.

14. The system as recited in claim 6 wherein said advertising comprises informing a routing module of said available bandwidth.

15. The system as recited in claim 6 wherein a platform deploying said system comprises a call control center.

16. An apparatus including a computer usable storage medium having a computer readable program code, when executed by a computer system, performs a method comprising:

receiving, at a call control center, a notification that identifies a failure of at least a portion of a data link and an impact the failure has on a bandwidth associated with the data link;

determining, in the call control center, an available bandwidth associated with the data link after the failure responsive to the impact the failure has on the bandwidth associated with the data link received in the notification;

transmitting, to a route controller, the available bandwidth for the data link from the call control center, the available bandwidth determined responsive to the received notification, the route controller to receive the available bandwidth from the call control center and to direct utilization of the data link by one or more connections according to the communicated available bandwidth from the call control center;

comparing, at the call control center, the available bandwidth associated with the data link after the failure to a bandwidth guaranteed to connections utilizing the data link;

releasing, by the call control center, one or more of the connections from the data link based on a configured policy when the bandwidth guaranteed to connections utilizing the data link is greater than the available bandwidth associated with the data link after the failure, wherein the call control center includes a controlled release mechanism to generate the configured policy and to direct an incremental release of connections from the data link based on developing bandwidth limitations;

detecting, at the call control center, the data link is recovering from the failure;

determining, at the call control center, a new available bandwidth associated with the recovery of the data link from the failure; and delaying transmission of the new available bandwidth to the route controller, from the call control center, for a predetermined period of time, wherein the route controller is configured to divert one or more connections to the data link according to the new available bandwidth received from the call control center.

17. The apparatus as recited in claim 16 wherein said releasing comprises releasing at least one connection based on a low priority of the connection relative to a non-released connection.

18. The apparatus as recited in claim 16 wherein said releasing comprises releasing at least one connection that includes non-real-time critical information before releasing a connection that includes real-time critical information.

19. The apparatus as recited in claim 16 wherein said controlled release mechanism reduces hysteresis in said data link.

20. The apparatus as recited in claim 16 wherein said data links comprises a virtual link selected from the group including Inverse Multiplexing for Asynchronous Transfer Mode (IMA), Label Switched Paths (LSP) for Multi-Protocol Label Switching (MPLS) and Asynchronous Transfer Mode Virtual Path Connections (ATM VPCs).

21. A system comprising:

means for receiving a notification that identifies a failure of at least a portion of a data link and an impact the failure has on a bandwidth associated with the data link;

means for determining an available bandwidth associated with the data link after the failure responsive to the impact the failure has on the bandwidth associated with the data link received in the notification;

means for communicating, to a route controller, the available bandwidth for the data link that was determined responsive to the received notification, the route controller to receive the available bandwidth from the means for communicating and to direct utilization of the data link by one or more connections according to the communicated available bandwidth from the call control center;

means for comparing the available bandwidth associated with the data link after the failure to a bandwidth guaranteed to connections utilizing the data link;

means for releasing one or more of the connections from the data link based on a configured policy when the bandwidth guaranteed to connections utilizing the data link is greater than the available bandwidth associated with the data link after the failure, wherein the means for releasing is configured to generate the configured policy and to direct an incremental release of connections from the data link based on developing bandwidth limitations;

means for detecting the data link is recovering from the failure;
means for determining a new available bandwidth associated with the recovery of the data link from the failure; and
means for delaying communication of the new available bandwidth to the route controller for a predetermined period of time, wherein the route controller is configured to divert one or more connections to the data link according to the new available bandwidth received from the means for delaying.

22. The system as recited in claim 21 wherein said releasing means comprises means for releasing at least one connection based on a low priority of the connection relative to a non-released connection.

23. The system as recited in claim 21 wherein said releasing means comprises means for releasing at least one connection that includes non-real-time critical information before releasing a connection that includes real-time critical information.

24. The system as recited in claim 21 wherein said means for releasing reduces hysteresis in said data link.

25. The system as recited in claim 21 wherein said aggregated link comprises a virtual link selected from the group consisting essentially of Inverse Multiplexing for Asynchronous Transfer Mode (IMA), Label Switched Paths (LSP) for Multi-Protocol Label Switching (MPLS) and Asynchronous Transfer Mode Virtual Path Connections (ATM VPCs).

26. The method as recited in claim 1 includes
determining which side of the data link is responsible for releasing one or more of the connections from utilizing the data link; and
releasing the one or more of the connections from the data link when the call control center is determined to be the side of the data link responsible for the releasing.

27. The apparatus as recited in claim 16 further comprising
determining which side of the data link is responsible for releasing one or more of the connections from utilizing the data link; and
releasing the one or more of the connections from the data link when the call control center is determined to be the side of the data link responsible for the releasing.

28. The system as recited in claim 21 includes
means for determining which side of the data link is responsible for releasing one or more of the connections from utilizing the data link; and
means for releasing the one or more of the connections from the data link when the call control center is determined to be the side of the data link responsible for the releasing.

\* \* \* \* \*

UNITED STATES PATENT AND TRADEMARK OFFICE
CERTIFICATE OF CORRECTION

PATENT NO.      : 7,602,726 B1             Page 1 of 1
APPLICATION NO. : 10/639151
DATED           : October 13, 2009
INVENTOR(S)     : Sundaresan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Fifth Day of October, 2010

David J. Kappos
*Director of the United States Patent and Trademark Office*